US009050863B2

(12) United States Patent
Shima et al.

(10) Patent No.: US 9,050,863 B2
(45) Date of Patent: Jun. 9, 2015

(54) TIRE AIR PRESSURE MONITOR DEVICE

(75) Inventors: Takashi Shima, Ebina (JP); Kazuo Sakaguchi, Ebina (JP); Syoji Terada, Hiratsuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 246 days.

(21) Appl. No.: 13/822,117

(22) PCT Filed: Feb. 20, 2012

(86) PCT No.: PCT/JP2012/053974
§ 371 (c)(1),
(2), (4) Date: Mar. 11, 2013

(87) PCT Pub. No.: WO2012/157306
PCT Pub. Date: Nov. 22, 2012

(65) Prior Publication Data
US 2013/0169428 A1    Jul. 4, 2013

(30) Foreign Application Priority Data

May 13, 2011    (JP) .................................. 2011-107744

(51) Int. Cl.
*B60C 23/00*    (2006.01)
*B60C 23/02*    (2006.01)
*B60C 23/04*    (2006.01)

(52) U.S. Cl.
CPC ............ *B60C 23/02* (2013.01); *B60C 23/0408* (2013.01); *B60C 23/0416* (2013.01); *B60C 23/0488* (2013.01); *B60C 23/0489* (2013.01)

(58) Field of Classification Search
CPC ........................ B60C 23/0408; B60C 23/0408
USPC ......................................... 340/447; 73/146.4
See application file for complete search history.

(56) References Cited

U.S. PATENT DOCUMENTS 5,808,190 A * 9/1998 Ernst ............................ 73/146.5
6,112,587 A * 9/2000 Oldenettel .................... 73/146.5

FOREIGN PATENT DOCUMENTS

| JP | 2005-190116 A | 7/2005 |
| JP | 2006-138803 A | 6/2006 |
| JP | 2010-122023 A | 6/2010 |

OTHER PUBLICATIONS

An English translation of the Chinese Office Action for the corresponding Chinese patent application No. 201280003178.0 issued on Nov. 4, 2014.
An English translation of the Russian Notice of Allowance for the corresponding Russian patent application No. 2013110521/11(015591) issued on Sep. 29, 2014.

* cited by examiner

*Primary Examiner* — Hai Phan
*Assistant Examiner* — Zhen Y Wu
(74) *Attorney, Agent, or Firm* — Global IP Counselors, LLP

(57) ABSTRACT

When the difference between the first rotating period determined based on detection by the G sensor and the second rotating period Ta determined based on the detected value of the wheel velocity sensor is equal to or smaller than the prescribed value, the rotational position of each wheel corresponding to the wireless signal transmitted at the prescribed rotational position is adopted in determining the wheel position; when the difference is over the prescribed value, the rotational position of each wheel corresponding to the wireless signal transmitted at the rotational position different from the rotational position is not used in determining the wheel position.

3 Claims, 6 Drawing Sheets

TIRE AIR PRESSURE MONITOR DEVICE

CROSS-REFERENCE TO RELATED APPLICATIONS

This application is a U.S. National stage application of International Application No. PCT/JP2012/053974, filed Jul. 5, 2011, which claims priority under to Japanese Patent Application No. 2011-100747, filed in Japan on May 13, 2011, the entire contents of which is hereby incorporated by reference.

BACKGROUND

1. Field of the Invention

This invention relates to a tire pneumatic pressure monitoring apparatus.

2. Background Information

According to the tire pneumatic pressure monitoring apparatus described in Japanese Laid-Open Patent Application No. 2010-122023, each transmitter always sends out a wireless signal at a prescribed rotational position; when the wireless signals are received on the side of the vehicle, the rotational positions of the wheels are detected; the wheel position corresponding to the rotational position that is best in synchronization with the output period of the wireless signal among the rotational positions of the wheels is determined as the wheel position of the corresponding transmitter.

SUMMARY

According to the prior art described above, for the transmitter, the rotational position of the transmitter is determined from the detected value of an acceleration sensor, and a wireless signal is output at the time when the detected value of the acceleration sensor becomes the prescribed value. Consequently, when the detected value of the acceleration sensor contains noises caused by road surface input, etc., the transmitter may misread the rotational position and, thus, outputs the wireless signal at a rotational position different from the prescribed rotational position. In this case, the data of the incorrect rotational position is adopted in determination of the wheel position of the transmitter, so that the precision in determination of the wheel position decreases.

The purpose of the present invention is to provide a tire pneumatic pressure monitoring apparatus that can determine the wheel position of each transmitter with a high degree of precision.

In order to realize the purpose described above, according to the present invention, when the difference between the first rotating period determined based on the detection by the acceleration sensor and the second rotating period determined based on the detected value by the wheel velocity sensor is equal to or smaller than a prescribed value, a determination is made that the wireless signal is transmitted at the prescribed rotational position; based on the rotational positions of the wheels when the wireless signal is transmitted, the wheel position of the transmitter corresponding to the identification information is determined.

When the difference between the first rotating period and the second rotating period is equal to or smaller than the prescribed value, there is a high possibility that the wireless signal is transmitted at the prescribed rotational position; on the other hand, when the difference described above is over the prescribed value, there is a high possibility that the wireless signal is transmitted at a rotational position other than the prescribed rotational position. Consequently, only when the difference described above is equal to or smaller than the prescribed value, the rotational positions of the wheels are adopted in determination of the wheel position. When the difference described above is over the prescribed value, the rotational positions of the wheels are not adopted in determination of the wheel position. As a result, it is possible to make a highly precise determination of the wheel position of the transmitter.

BRIEF DESCRIPTION OF THE DRAWINGS

Referring now to the attached drawings which form a part of this original disclosure.

DETAILED DESCRIPTION OF THE EMBODIMENTS

Figure 1:
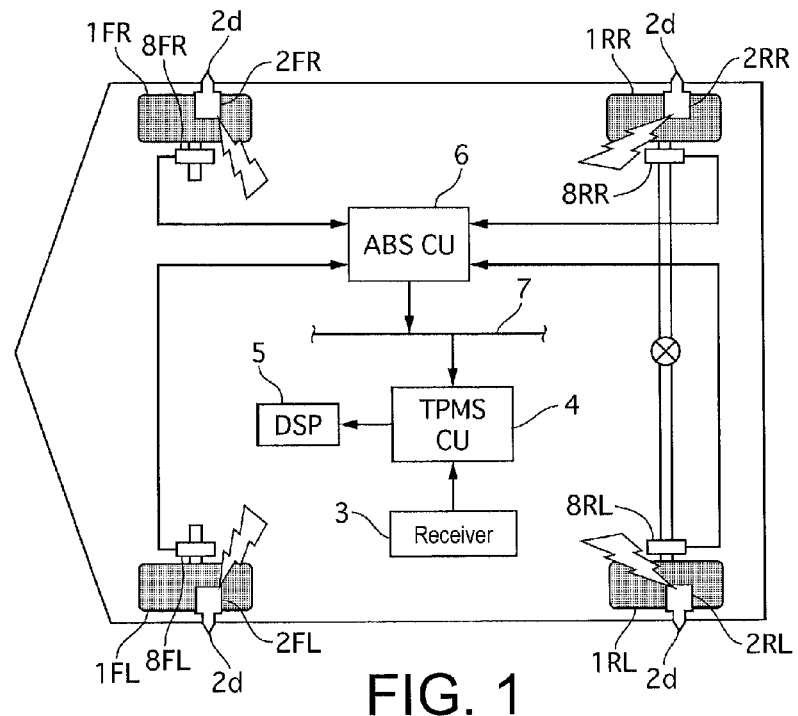
FIG. 1 is a diagram illustrating the configuration of the tire pneumatic pressure monitoring apparatus in Application Example 1.

In the following, the embodiments of the present invention will be explained with reference to the application examples illustrated in the drawings.

Application Example 1

FIG. 1 is a diagram illustrating the configuration of the tire pneumatic pressure monitoring apparatus in Application Example 1. In this figure, the letters annexed to the tails of the various keys are defined as follows: FL stands for the left front wheel, FR stands for the right front wheel, RL stands for the left rear wheel, and RR stands for the right rear wheel. In the following explanation, if not needed for the specific explanation, the description of FL, FR, RL and RR will not be discussed.

The tire pneumatic pressure monitoring apparatus in Application Example 1 has TPMS (the tire pressure monitoring system) sensors 2, a TPMS controller (TPMSCU) 4, a display 5, and wheel velocity sensors 8. The TPMS sensors 2 are installed on the wheels 1, respectively, and the receiver 3, the TPMSCU 4, the display 5 and the wheel velocity sensors 8 are arranged on the side of the vehicle body.

Figure 2:
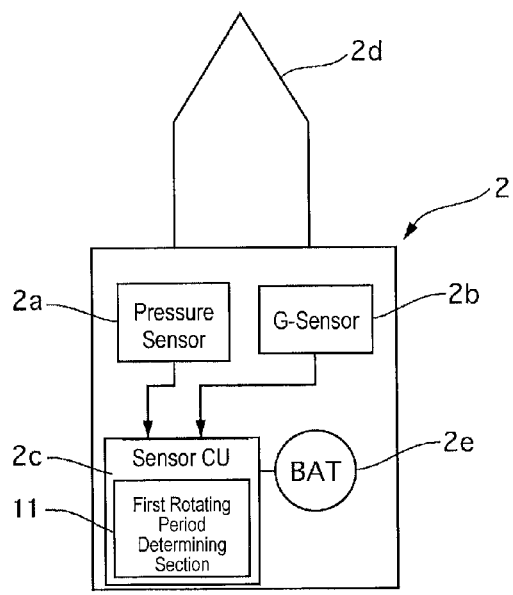
FIG. 2 is a diagram illustrating the configuration of the TPMS sensor 2.

The TPMS sensor 2 is installed at the position of the air valve (not shown in the figure) of each tire. FIG. 2 is a diagram illustrating the configuration of the TPMS sensor 2. The TPMS sensor 2 comprises a pressure sensor (the tire pneumatic pressure detecting means) 2a, an acceleration sensor (G sensor) 2b, a sensor controller (sensor CU) 2c, a transmitter 2d, and a button battery 2e.

Here, the pressure sensor 2a detects the pneumatic pressure [kPa] of the tire.

The G sensor 2b detects the acceleration in the centrifugal direction [G] acting on the tire.

The sensor CU 2c works with the power supplied from the button battery 2e, and the TPMS data containing the pneumatic pressure information of the tire detected by the pressure sensor 2a and the sensor ID (the identification information) are sent as a wireless signal from the transmitter 2d. In Application Example 1, the sensor IDs include 1 to 4.

The sensor CU 2c compares the acceleration in the centrifugal direction detected by the G sensor 2b with a preset running determination threshold. If the acceleration in the centrifugal direction is lower than the running determination threshold, a determination is made that the vehicle stops, so that transmission of the TPMS data is turned off. On the other hand, if the acceleration in the centrifugal direction is over the running determination threshold, a determination is made that the vehicle is running, and the TPMS data are transmitted at a prescribed time.

The receiver 3 receives the wireless signals output from the various TPMS sensors 2, decodes them, and outputs the results to the TPMSCU 4.

The TPMSCU 4 reads the various TPMS data; from the sensor ID of the TPMS data and with reference to the corresponding relationship between the various sensor IDs and the wheel positions stored in the nonvolatile memory 4d (see FIG. 3), the TPMSCU determines what wheel position the TPMS data correspond to, and the TPMSCU displays the pneumatic pressure of the tire contained in the TPMS data as the pneumatic pressure at the corresponding wheel position on the display 5. When the pneumatic pressure of a tire becomes below the lower threshold, a decrease in the pneumatic pressure is notified by a change in the display color, by flashing on the display, by an alarm sound, or the like.

Based on the wheel velocity pulses from the various wheel velocity sensors 8, the ABSCU 6 detects the wheel velocities of the wheels 1, respectively. When a certain wheel has a lock tendency, an ABS actuator not shown in the figure is turned on to adjust or to maintain the wheel cylinder pressure of the corresponding wheel to suppress the lock tendency. In this way, the anti-skid brake control is carried out. The ABSCU 6 outputs the count value of the wheel velocity pulses to the CAN communication line 7 once a prescribed period of time (e.g., 20 msec) has passed.

Each wheel velocity sensor 8 is a pulse generator that generates the wheel velocity pulses for a prescribed number z (e.g., z=48) for each cycle of the rotation of the wheel 1. The wheel velocity sensor comprises a gear-shaped rotor rotating in synchronization with the wheel 1 and a permanent magnet and a coil arranged on the side of the vehicle body and facing the outer periphery of the rotor. As the rotor rotates, the concavo-convex surface of the rotor cuts through the magnetic field formed on the periphery of the wheel velocity sensor 8, so that the magnetic flux density varies to generate a electromotive force in the coil, and such a variation in the voltage is output as the wheel velocity pulse signal to the ABSCU 6.

As explained above, based on the corresponding relationship between the sensor ID and the wheel position stored in the memory 4d, the TPMSCU 4 determines to which wheel the received TPMS data belong. Consequently, tire rotation is carried out while the vehicle stops there, the corresponding relationship between the sensor ID and the wheel position stored in the memory 4d is not in agreement with the actual corresponding relationship, and it is impossible to find out to which wheel the TPMS data belong. Here, "tire rotation" refers to the operation of swapping the installing positions of the tires so as to ensure even tread wear for the tires and, thus, to prolong the service lifetime (the tread lifetime). For example, for a sedan, usually the front/rear wheels are swapped while the left/right tire positions are crossed.

Here, according to Application Example 1, the corresponding relationship between the sensor ID and the wheel position after a tire rotation is stored by updating the memory 4d for recognition. Consequently, tire rotation can be carried out. In this case, for the TPMS sensors 2, the transmission period of the TPMS data is changed; for the TPMSCU 4, based on the transmission period of the TPMS data and the wheel velocity pulses, a determination is made regarding which wheel each of the TPMS sensors 2 belongs to.

Constant-Position Transmission Mode

When the vehicle stop determination time right before the start of running the vehicle is over a prescribed time (e.g., 15 min), the sensor CU 2c of the TPMS sensor 2 determines that the tire rotation may have been carried out.

When the vehicle stop determination time right before the start of running the vehicle is shorter than a prescribed time, the sensor CU 2c executes the "normal mode" in which the TPMS data are transmitted once a prescribed interval (e.g., 1-min interval) has passed. On the other hand, when the vehicle stop determination time is longer than the prescribed time, the sensor CU executes the "constant position transmission mode" in which, with an interval (e.g., about 16 sec) shorter than the transmission interval of the normal mode, the TPMS data are transmitted at a prescribed rotational position.

The constant position transmission mode is executed until the number of transmission rounds of the TPMS data reaches a prescribed number of rounds (e.g., 40 rounds). When the number of the transmission rounds reaches the prescribed number of rounds, the constant position transmission mode returns to the normal mode. When a determination has been made that the vehicle stops before the number of transmission rounds of the TPMS data reaches the prescribed number of rounds, if the vehicle stop determination time is shorter than the prescribed time (15 min), the constant position transmission mode before stopping the vehicle is continued until the number of transmission rounds reaches the prescribed number of rounds; when the vehicle stop determination time is longer than the prescribed time, the continuation of the constant position transmission mode before stopping the vehicle is cancelled, and a new constant position transmission mode is started.

In the constant position transmission mode, based on the gravity acceleration dependent component of the acceleration in the centrifugal direction detected by the G sensor 2b, the sensor CU 2c determines the transmission timing of the TPMS data in the constant position transmission mode. The acceleration in the centrifugal direction acting on the TPMS sensor 2 varies corresponding to the acceleration/deceleration of the wheels 1, yet the gravity acceleration dependent component is always steady; the acceleration in the centrifugal direction acting on the TPMS sensor displays a waveform with a top point of +1 [G], a bottom point of −1 [G], and the middle position at 90° between the top point and bottom point of 0 [G]. That is, by monitoring the magnitude and direction of the gravity acceleration component of the acceleration in the centrifugal direction, it is possible to find out the rotational position of the TPMS sensor 2. As a result, for example, as the TPMS data are output at the peak of the gravity acceleration dependent component, the TPMS data can always be output at the top point.

The sensor CU 2c has a first rotating period determining section 11. In the constant position transmission mode, the first rotating period determining section 11 determines the rotating period (the first rotating period) of the self wheel (the wheel where the corresponding TPMS sensor 2 is installed) when the TPMS data are transmitted. The first rotating period refers to the interval between the time of the transmission of the TPMS data and the peak time of the gravity acceleration dependent component of the acceleration in the centrifugal direction detected by the G sensor 2b right before the transmission of the TPMS data.

The sensor CU 2c has the first rotating period determined by the first rotating period determining section 11 annexed to the TPMS data and transmits them.

Automatic running mode

When the time lapsed from OFF to ON of the ignition switch is over a prescribed time (e.g., 15 min), the TPMSCU 4 determines that the tire rotation may have been carried out.

When the time lapsed from OFF to ON of the ignition switch is shorter than the prescribed time, based on the pneumatic pressure information in the TPMS data transmitted from each TPMS sensor 2, the TPMSCU 4 executes the "monitor mode" in which the pneumatic pressure of the tire of each wheel 1 is monitored. On the other hand, when the time lapsed from OFF to ON of the ignition switch is longer than the prescribed time, the TPMSCU executes the "automatic running mode" in which the wheel position of each TPMS sensor 2 is determined. In the automatic running mode, the mode is continually executed until the wheel position has been determined for all of the TPMS sensors 2 or until a prescribed accumulated running time (e.g., 8 min) has lapsed from start of this mode. When the wheel position has been determined for all of the TPMS sensors 2, or when the prescribed accumulated running time has lapsed, the operation goes to the monitoring mode.

Even in the automatic running mode, it is still possible to monitor the pneumatic pressure of the tires from the pneumatic pressure information contained in the TPMS data. Consequently, the display of the pneumatic pressure and the warning of decreased pneumatic pressure are carried out based on the corresponding relationship between the sensor ID and the wheel position currently stored in the memory 4d during the automatic running mode.

In the automatic running mode, the TPMSCU 4 has the count value of the wheel velocity pulses input from the ABS controller (ABSCU) 6 via the CAN communication line 7 input to the TPMSCU and executes the wheel position determination control presented below.

Wheel Position Determination Control

Figure 3:
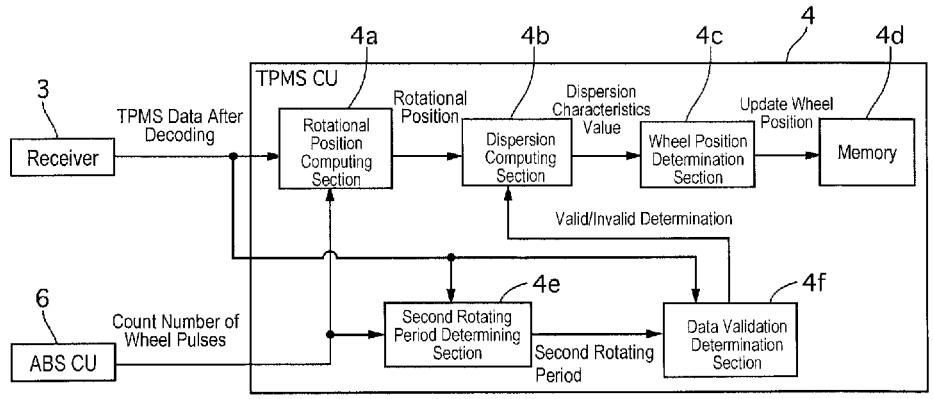
FIG. 3 is a control block diagram illustrating the TPMSCU4 for executing the wheel position determination control in Application Example 1.

FIG. 3 is a block diagram illustrating the control of the TPMSCU 4 for executing the wheel position determination control in Application Example 1. The TPMSCU 4 has a rotational position computing section (the rotational position detecting means) 4a, a dispersion computing section 4b, a wheel position determination section (the wheel position determination means) 4c, a memory 4d, a second rotating period determining section 4e, and a data validation determination section (the determination section) 4f.

The rotational position computing section 4a has the TPMS data after decoding the output from the receiver 3 and the count values of the wheel velocity pulses output from the ABSCU 6 to the CAN communication line 7 input into the rotational position computing section and computes the rotational position (the number of teeth of the rotor) of each wheel 1 when the rotational position of each TPMS sensor 2 is at the top point. Here, the "the number of teeth of the rotor" refers to the teeth of the rotor that are being counted by the wheel velocity sensor 8, and the number of teeth of the rotor can be determined by dividing the count value of the wheel velocity pulses by the count value of 1 cycle of rotation of the tire (=number of teeth of 1 cycle z=48). In Application Example 1, when the count value of the wheel velocity pulses of the first round from the start of the automatic running mode is input, the value obtained by adding 1 to the remainder of the operation of the division of the count value by the number of teeth of 1 cycle is taken as the reference number of teeth; in the second round and thereafter, the number of teeth is determined based on the count number of the wheel velocity pulses (the current count value−the count value of the first round) from the reference number of teeth.

Figure 4:
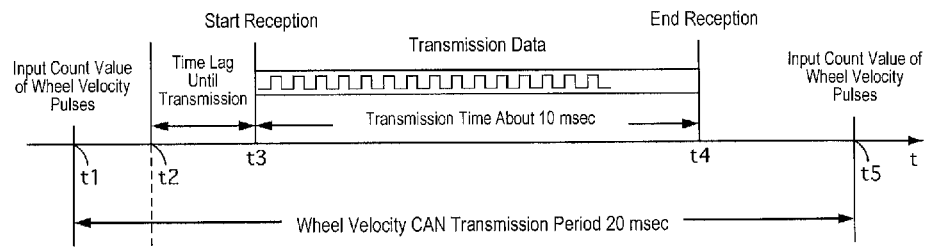
FIG. 4 is a diagram illustrating the method for computing the rotating period of each wheel 1.

FIG. 4 is a diagram illustrating the method for computing the rotational position of each wheel 1.

In FIG. 4, t1 represents the time when the count value of the wheel velocity pulses is input; t2 represents the time when the rotational position of the TPMS sensor 2 reaches the top point; t3 represents the time when the TPMS sensor 2 actually starts the transmission of the TPMS data; t4 represents the time when the reception of the TPMS data by the TPMSCU 4 ends; and t5 represents the time when the count value of the wheel velocity pulses is input. In this case, t1, t4, and t5 can be actually measured; t3 can be computed by subtracting the data length (of a nominal value, e.g., about 10 msec) of the TPMS data from t4; and t2 can be computed by subtracting the time lag in the transmission (t2 can be determined beforehand by experiment or the like) from t3.

Consequently, suppose the number of teeth at t1 is $z_{t1}$, the number of teeth at t2 is $z_{t2}$, and the number of teeth at t5 is $z_{t5}$, one has $$(t2-t1)/(t5-t1)=(z_{t2}-z_{t1})/(z_{t5}-z_{t1})$$

Because $$z_{t2}=z_{t1}+(z_{t5}-z_{t1})*(t2-t1)/(t5-t1)$$

The number of teeth $z_{t2}$ when the rotational position of the TPMS sensor 2 is at the top point becomes:

$$z_{t2}-z_{t1}=(z_{t5}-z_{t1})*(t2-t1)/(t5-t1)$$

The dispersion computing section 4b works as follows: among the rotational positions of the wheels 1 computed by the rotational position computing section 4a, the rotational positions of the wheels 1 determined to be valid data by the data validation determination section 4f are accumulated for the sensor IDs, respectively, and taken as the rotational position data; the degree of the dispersion of the rotational position data for each sensor ID is computed as the dispersion characteristics value. The computing of the dispersion characteristics value is carried out each time when the rotational position of the corresponding sensor ID is computed by the rotational position computing section 4a.

Figure 5:
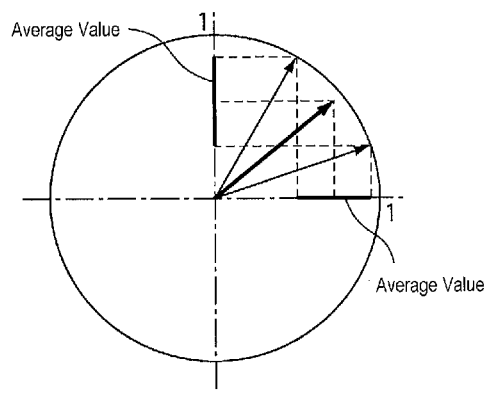
FIG. 5 is a diagram illustrating the method for computing the dispersion characteristics value.

FIG. 5 is a diagram illustrating the method for computing the dispersion characteristics value. According to Application Example 1, a unit circle (a circle with radius of 1) with the origin (0, 0) on the two-dimensional plane is considered, and the rotational position θ [deg] (=360×the number of teeth of the rotor/48) of each wheel 1 is converted to the coordinates (cos θ, sin θ) in the circumstance of the unit circle. That is, the rotational position of each wheel 1 is computed as follows: consider the vector having the origin (0, 0) as the starting point and the coordinates (cos θ, sin θ) as the end portion, and having a length of 1, the average vectors (ave_cos θ, ave_sin θ) of the vectors of the same rotational position data are determined, and the scalar quantity of the average vector is computed as the dispersion characteristics value X of the rotational position data.

$$(\cos θ, \sin θ)=(\cos((z_{i2}+1)*2\pi/48), \sin((z_{i2}+1)*2\pi/48))$$

Consequently, suppose the reception round number of the TPMS data of the same sensor ID is n (n is a positive integer), the average vectors (ave_cos θ, ave_sin θ) are as follows:

$$(ave\_cos\ θ, ave\_sin\ θ)=((\Sigma(\cos θ))/n, (\Sigma(\sin θ))/n)$$

The dispersion characteristics value X can be represented as follows:

$$X=ave\_cos\ θ^2+ave\_sin\ θ^2$$

The wheel position determination section 4c works as follows: the dispersion characteristics values X of the various rotational position data of the same sensor ID computed by the dispersion computing section 4b are compared; when the largest value of the dispersion characteristics values X is larger than the first threshold (e.g., 0.57), while the remaining 3 dispersion characteristics values X are all smaller than the second threshold (e.g., 0.37), a determination is made that the wheel position of the rotational position data corresponding to the dispersion characteristics value X with the largest value, that is, the wheel position of the wheel velocity sensor 8 that has detected the corresponding rotational position data, is the wheel position of the TPMS sensor 2 corresponding to the sensor ID of the rotational position data. This determination is carried out for all of the sensor IDs; the corresponding relationship between the sensor ID and the wheel position is determined, and the storage in the memory 4d is updated for registration.

Based on the TPMS data after decoding and the count value of the wheel velocity pulses, the second rotating period determining section 4e determines the rotating period (the second rotating period) of the self wheel (the wheel where the corresponding TPMS sensor 2 is installed) when the TPMS data are transmitted. The second rotating period is the average value of the rotating periods of the various wheels 1.

The data validation determination section 4f compares the first rotating period and the second rotating period contained in the TPMS data and determines whether the rotational positions of the wheels 1 detected when the TPMS data are transmitted is valid data or invalid data. In Application Example 1, when the relationship between the first rotating period Tp and the second rotating period Ta meets the following listed formula (1), the data are determined to be valid data; if this relationship is not met, the data are determined to be invalid data.

$$|Tp-Ta| \le \alpha \quad (1)$$

Here, α has a prescribed value (e.g., 0.1). However, α may also be variable corresponding to the vehicle' state, as well as the delay time in communication and the computing operation.

The first rotating period determining section 11, the second rotating period determining section 4e and the data validation determination section 4f form the transmitting position determination means that determines whether the corresponding wireless signal is transmitted at the preset (the prescribed) rotational position (the top point).

Wheel Position Determination Control Process

Figure 6:
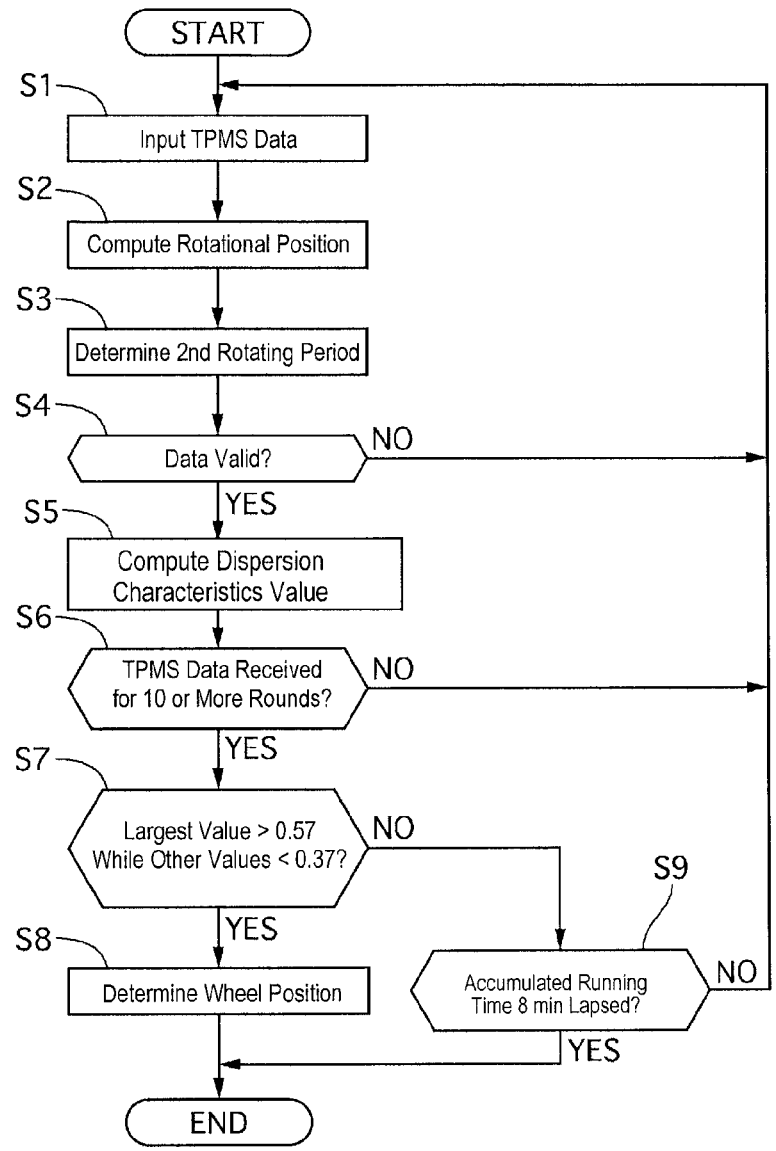
FIG. 6 is a flow chart illustrating the flow of the wheel position determination control process in Application Example 1.

FIG. 6 is a flow chart illustrating the flow of the wheel position determination control process according to Application Example 1. In the following, the various steps of operation will be explained. In the following explanation, the case of the sensor ID=1 is assumed. However, for the other IDs (ID=2, 3, 4), the wheel position determination control process is also carried out in parallel.

In step S1, the rotational position computing section 4a receives the TPMS data with the sensor ID=1.

In step S2, the rotational position computing section 4a computes the rotational position of each wheel 1.

In step S3, the second rotating period determining section 4e determines the second rotating period.

In step S4, the data validation determination section 4f determines whether the rotational positions of the various wheels 1 computed in step S2 are valid data. When the determination result is YES, the operation goes to step S5. If NO, the operation returns to step S1.

In step S5, the dispersion computing section 4b computes the dispersion characteristics values X of the rotational position data of the wheels 1.

In step S6, a determination is made regarding whether the TPMS data with sensor ID equal to 1 are received for a prescribed number of rounds (e.g., 10 rounds) or more. If the determination result is YES, the operation goes to step S7. If the determination result is NO, the operation returns to step S1.

In step S7, the wheel position determination section 4c determines whether the largest value of the dispersion characteristics value is over the first threshold of 0.57 and whether the value of the remaining dispersion characteristics values are smaller than the second threshold of 0.37. If the determination result is YES, the operation goes to step S8; if the determination result is NO, the operation goes to step S9.

In step S8, the wheel position determination section 4c determines the wheel position of the rotational position data corresponding to the highest dispersion characteristics value as the wheel position of the corresponding sensor ID. Then, the automatic running mode ends.

In step S9, the wheel position determination section 4c determines whether a prescribed accumulated running time (e.g., 8 min) has lapsed from the start of the automatic running mode. If the determination result is YES, the automatic running mode is ended. If the determination result is NO, the operation returns to step S1.

When the wheel position determination section 4c can determine the wheel positions for all of the sensor IDs within a prescribed accumulated running time, the corresponding relationship between the sensor ID and the wheel position is updated and stored in the memory 4d for registration. On the other hand, when it is impossible to determine the wheel position for all of the sensor IDs within the prescribed accumulated running time, the corresponding relationship between the sensor IDs and the various wheel positions currently stored in the memory 4d remains in use.

In the following, the operation will be explained.

Operation of the wheel position determination by the dispersion degree of the rotational position data The TPMS sensor 2 works as follows: when the vehicle stop determination time right before the start of running a vehicle is 15 min or longer, a determination is made that there is a possibility that the tire rotation has been carried out, and the operation goes from the normal mode to the constant position transmission mode. In the constant position transmission mode, after 16 seconds lapse from the transmission time of the last round and the self-rotational position reaches the top point, the various TPMS sensors 2 transmit the TPMS data.

On the other hand, when the time lapsed from OFF to ON of the ignition switch is 15 min or longer, the TPMSCU 4 goes from the monitoring mode to the automatic running mode. In the automatic running mode, each time when the TPMS data are received from the TPMS sensors 2, the TPMSCU 4 computes the rotational position (the number of teeth of the rotor) of each wheel 1 when the rotational position of the TPMS sensor 2 reaches the top point. This is carried out repeatedly for 10 or more rounds, and the obtained rotational position data are accumulated. The wheel position corresponding to the rotational position data having the smallest dispersion degree among the various rotational position data is taken as the wheel position of the corresponding TPMS sensor 2.

When the vehicle runs, the rotation velocities of the wheels 1 become different due to the difference between the outer wheels and inner wheels, the lock and the slip of the wheels 1, and the difference in the pneumatic pressure of the tires. Even when the vehicle runs straight ahead, as the driver still may make minute corrections in the steering wheel and there is a certain difference in the road's surface on the left/right sides, the difference in the rotation velocity still is developed between the front/rear wheels 1FL and 1FR and between the left/right wheels 1RL and 1RR. That is, while there is a difference corresponding to the running of the vehicle, as the TPMS sensor 2 and the wheel velocity sensor 8 (the teeth of the rotor) rotate monolithically, for the output period of a certain TPMS sensor 2, the output period of the wheel velocity sensor 8 of the same wheel is kept synchronized (in agreement) independent of the running distance and the running state.

Consequently, by determining the degree of dispersion of the rotational position data of the wheels 1 with respect to the transmission period of the TPMS data, it is possible to make a highly precise determination on the wheel positions of the various TPMS sensors 2.

Figure 7:
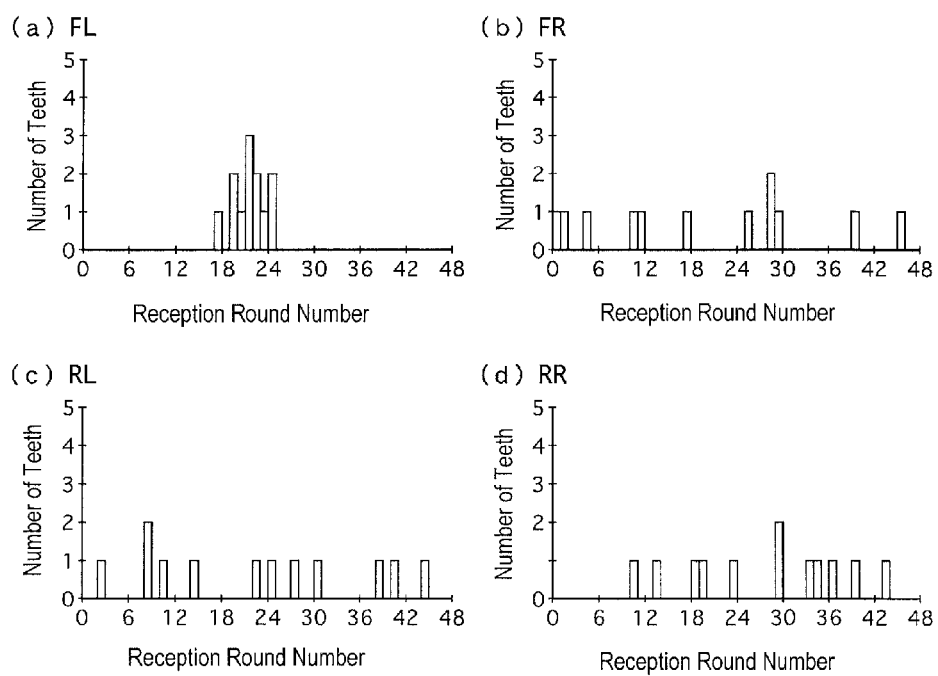
FIG. 7 is a diagram illustrating the relationship between the rotational positions (the rotor's number of teeth) of the wheels 1FL, 1FR, 1RL, 1RR when the rotational position of the TPMS sensor 2FL of the left front wheel 1FL is at the highest point and the reception round number of the TPMS data.

FIG. 7 illustrates the relationship between the rotational positions (the number of teeth of the rotors) of the wheels 1FL, 1FR, 1RL, and 1RR when the rotational position of the TPMS sensor 2FL of the left front wheel 1FL reaches the top point and the reception round number of the TPMS data. Here, (a) corresponds to the wheel velocity sensor 8FL of the left front wheel 1FL, (b) corresponds to the wheel velocity sensor 8FR of the right front wheel 1FR, (c) corresponds to the wheel velocity sensor 8RL of the left rear wheel 1RL, and (d) corresponds to the wheel velocity sensor 8RR of the right rear wheel 1RR.

As can be seen from FIG. 7, while the dispersion degree is high for the wheel position (the number of teeth) obtained from the wheel velocity sensors 8FR, 8RL, and 8RR of the remaining wheels (the right front wheel 1FR, the left rear wheel 1RL, and the right rear wheel 1RR), the dispersion degree of the wheel position obtained from the wheel velocity sensor 8FL of the self wheel (the left front wheel 1FL) is the smallest, so that the output period of the TPMS sensor 2FL and the output period of the wheel velocity sensor 8FL are nearly in synchronization with each other.

As one of the conventional tire pneumatic pressure monitoring apparatuss, an inclination sensor is arranged for each TPMS sensor, and the relationship between the wheel position of the TPMS sensor and the inclination angle is adopted to determine the wheel position of the TPMS sensor. For this type of tire pneumatic pressure monitoring apparatus in the prior art, corresponding to running the vehicle, the difference in the rotation velocity takes place between the 4 wheels, so that the corresponding relationship between the wheel position of the TPMS sensor and the inclination angle varies. As a result, it is impossible to make a highly precise determination on the wheel position of each TPMS sensor.

As another conventional tire pneumatic pressure monitoring apparatus, the same number of receivers as those of the TPMS sensors are arranged neighboring the sensors, respectively; based on the electromagnetic wave intensity of the received wireless signals, the wheel position of each TPMS sensor is determined. Here, it is necessary to take the sensor output, the receiver sensitivity dispersion, and the harness antenna effect into consideration for the layout of the receivers, and the reception environment and layout determine the performance. In addition, 4 receivers should be arranged. Consequently, the cost is higher.

On the other hand, for the tire pneumatic pressure monitoring apparatus in Application Example 1 of the present invention, the wheel position of each TPMS sensor 2 is determined without using the electromagnetic wave intensity, so that it is possible to determine the wheel position of each TPMS sensor 2 independent of the reception environment and the layout. In addition, one receiver 3 is enough, which allows for a cut the cost.

In addition, according to Application Example 1, in the TPMS sensor 2, the fact that the rotational position of the TPMS sensor 2 is at the top point can be computed from the gravity acceleration dependent component of the acceleration in the centrifugal direction by the G sensor 2b. Here, the G sensor 2b is already in use in the existing tire pneumatic pressure monitoring apparatuss in determining the stopping or running of the vehicles. Consequently, the existing TPMS sensors can be adopted as is, so that it is possible to cut the cost that would otherwise be needed for adding new sensors as the TPMS sensors 2.

In addition, according to Application Example 1, in the TPMSCU 4, the rotational position of each wheel 1 is computed from the wheel velocity pulses of the wheel velocity sensor 8. Here, the ABS unit is carried on almost all vehicles, and, as the wheel velocity sensors 8 are necessary parts in the ABS units, there is no need to add new sensors on the side of the vehicle. The cost can thus be cut.

Operation in determining the dispersion degree from the dispersion characteristics value]

Because the rotational position of the wheel 1 is the angle data with periodicity, the dispersion degree of the rotational position cannot be determined using the general dispersion formula defined by the average of the "square of the difference with the average."

Here, in Application Example 1, the dispersion computing section 4b works as follows: the rotational position θ of each wheel 1 obtained from each wheel velocity sensor 8 is converted to the coordinates (cos θ, sin θ) of the circumstance of the unit circle having the origin (0, 0) at the center. The coordinates (cos θ, sin θ) are taken as vectors, the average vectors (ave_cos θ, ave_sin θ) of the various vectors of the same rotational position data are determined, and the scalar quantity of the average vector is computed as the dispersion characteristics value X. As a result, it is possible to avoid the periodicity in determining the dispersion degree of the rotational position.

Operation of Valid Data Determination

By the sensor CU2c of the TPMS sensor 2, in the constant position transmission mode, based on the gravity acceleration dependent component of the acceleration in the centrifugal direction detected by the G sensor, the rotational position of the TPMS sensor 2 is detected, and the TPMS data are transmitted at the peak of the gravity acceleration dependent component. In this way, the TPMS data are transmitted always at the prescribed rotational position (the top point). Here, the acceleration in the centrifugal direction acting on the TPMS sensor 2 varies corresponding to the acceleration/deceleration of the wheel 1. However, the gravity acceleration dependent component keeps depicting a waveform with a steady width (−1 to 1 [G]); the gravity acceleration dependent component varies in a much shorter period with respect to the variation in the acceleration in the centrifugal direction in company with the acceleration/deceleration of the vehicle, so that a variation in the gravity acceleration dependent component from the acceleration in the centrifugal direction can be easily found.

However, when noises caused by road surface input, etc. are contained in the detected value by the G sensor 2b, the value of the gravity acceleration dependent component of the acceleration in the centrifugal direction becomes disturbed; when the peak (1 [G]) is reached at the rotational position before the TPMS sensor 2 reaches the top point or at the rotational position after the TPMS sensor overruns the top point, the transmitter 2d makes an erroneous determination for the rotational position, and the TPMS data are, thus, transmitted at a rotational position different from the top point.

Based on the reception timing of the TPMS data and the count value of the wheel velocity pulses in this case, the rotational position computing section 4a of the TPMSCU 4 computes the rotational position of each wheel 1 when the rotational position of the TPMS sensor 2 reaches the top point. Consequently, the rotational position computing section 4a computes the rotational position of each wheel 1 with the TPMS data transmitted at the rotational position other than the top point as the TPMS data transmitted at the top point, and the dispersion computing section 4b computes the dispersion characteristics value of each wheel 1 having the rotational position contained in the rotational position data. As a result, the erroneous rotational position data are contained in the rotational position data, and the generation of the difference between the largest value of each dispersion characteristics value X and the remaining values becomes delayed; thus, the determination of the wheel position is delayed.

On the other hand, according to Application Example 1 of the present invention, the data validation determination section 4f works as follows: when the absolute value of the difference between the first rotating period Tp and the second rotating period Ta is equal to or smaller than the prescribed value α, a determination is made that the rotational position of the wheel 1 detected when the TPMS data are transmitted are the valid data; on the other hand, when the absolute value of the difference between the first rotating period Tp and the second rotating period Ta is larger than the prescribed value α, a determination is made that the rotational position of the wheel 1 detected when the TPMS data are transmitted are invalid data.

Based on the rotational position data that accumulate only the rotational position of each wheel 1 determined to be the valid data, the dispersion computing section 4b computes the dispersion characteristics value X of each wheel 1.

That is, by determining the first rotating period Tp, the timing for the actual transmission of the TPMS data is determined. Consequently, when the two rotating periods Tp and Ta are compared with each other and their difference is small (the absolute value of the difference is equal to or smaller than the prescribed value α), it is possible to determine that the corresponding TPMS data are transmitted at the prescribed rotational position; on the other hand, when the difference is large (the absolute value of the difference is larger than the prescribed value α), it is possible to determine that the corresponding TPMS data are not transmitted at the prescribed rotational position.

Figure 8:
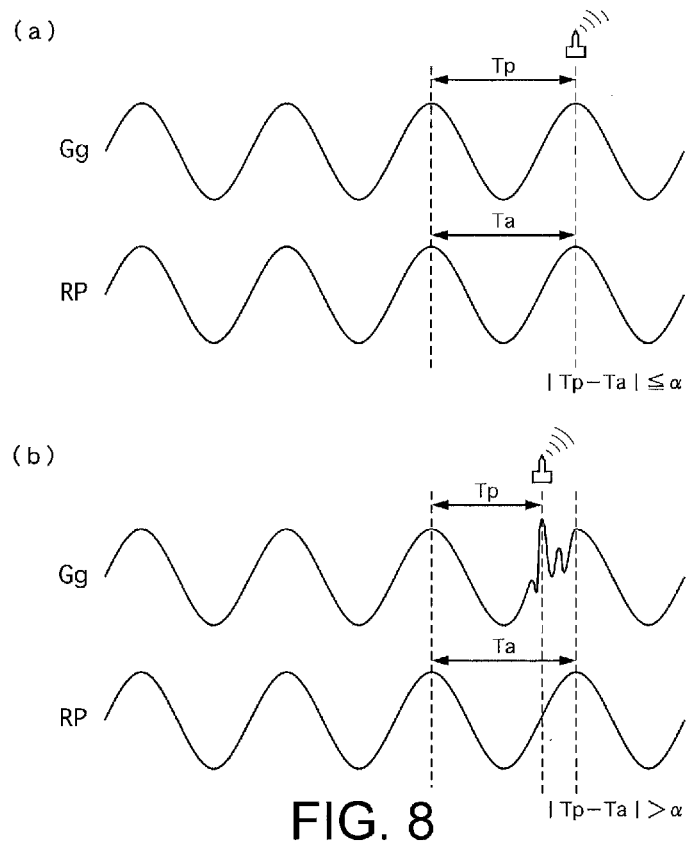
FIG. 8 is a diagram illustrating the variation over time in the gravity acceleration dependent component Gg of the acceleration in the centrifugal direction detected by the G sensor $2b$ of a certain wheel and the rotational position RP of this wheel determined from the count value of the various wheel velocity pulses.

FIG. 8 is a diagram illustrating the variation over time of the gravity acceleration dependent component Gg of the acceleration in the centrifugal direction detected by the G sensor 2b of a certain wheel and the rotational position RP of the wheel determined from the count value of the wheel velocity pulses.

The first rotating period Tp is the interval between the time of the transmission of the TPMS data and the time corresponding to the peak of the gravity acceleration dependent component of the acceleration in the centrifugal direction detected by the G sensor 2b right before the time described above. Consequently, as shown in FIG. 8(a), when the TPMS data are transmitted when the TPMS sensor 2 is at the top point, the first rotating period Tp is nearly in agreement with the rotating period of the self wheel. Here, the second rotating period Ta is determined as the rotating period of the self wheel based on the wheel velocity pulses, and the second rotating period can be taken as the rotating period of the self wheel. That is, as shown in FIG. 8(a), when the absolute value of the difference between the first rotating period Tp and the second rotating period Ta is equal to or smaller than the prescribed value α, a determination is made that the TPMS data are transmitted at the prescribed rotational position (top point).

On the other hand, as shown in FIG. 8(b), in the case when the gravity acceleration dependent component Gg reaches the peak (1 [G]) at the position before the TPMS sensor 2 reaches the prescribed rotational position due to noise, and when the TPMS data are transmitted at the corresponding position, the first rotating period Tp is shorter than the second rotating period Ta (≈self wheel's rotating period), and the difference between the two periods becomes larger. That is, as shown in FIG. 8(b), when the absolute value of the difference between the first rotating period Tp and the second rotating period Ta is over the prescribed value α, a determination is made that the TPMS data are not transmitted at the prescribed rotational position.

As explained above, as long as the absolute value of the difference between the first rotating period Tp and the second rotating period Ta is smaller than the prescribed value α, a determination is made that the rotational positions of the wheels 1 detected when the TPMS data are transmitted are valid data; by computing the dispersion characteristics values X of the wheels 1 using the rotational positions of the wheels 1 determined to be valid data, it is possible to prevent computing the dispersion characteristics values X using the erroneous data, and the corresponding relationship between the sensor ID and the wheel position can quickly be determined with a high degree of precision.

In the following, the effects will be explained.

For the tire pneumatic pressure monitoring apparatus in Application Example 1, the following effects can be realized.

(1) In the tire pneumatic pressure monitoring apparatus that monitors the pneumatic pressure of each tire, there are the following parts: a pressure sensor 2a that detects the pneumatic pressure of the tire and that is installed on the tire of each wheel 1; a pressure sensor 2a for detecting the pneumatic pressure of each tire; a G sensor 2b that detects the acceleration in the centrifugal direction acting on tire and that is installed on the tire of each wheel 1; a transmitter 2d that detects the rotational position of the wheel based on the detected value of the G sensor 2b and transmits the pneumatic pressure at the prescribed rotational position together with the sensor ID as the TPMS data for each wheel; a receiver 3 that is arranged on the side of the vehicle body and receives the TPMS data; a wheel velocity sensor 8 that is arranged on the side of the vehicle body corresponding to each wheel 1 and detects the velocity of the corresponding wheel; a rotational position computing section 4a that detects the rotational position of each wheel 1 when the TPMS data containing the sensor ID are transmitted; a transmitting position determination means (the first rotating period determining section 11, the second rotating period determining section 4e, and the data validation determination section 4f) that includes a first rotating period section 11 that determines as the first rotating period Tp the rotating period of the wheel corresponding to the sensor ID when the TPMS data are transmitted, a second rotating period determining section 4e that determines as the second rotating period Ta the rotating period of the wheel corresponding to the sensor ID when the TPMS data are transmitted based on the detected value of the wheel velocity sensor 8, and a data validation determination section 4f that determines the fact of the transmission of the TPMS data at the prescribed rotational position when the absolute value of the difference between the first rotating period Tp and the second rotating period Ta is smaller than a prescribed value α; and the wheel position determination section 4c that determines the wheel position of the transmitter corresponding to the sensor ID based on the rotational position of each wheel when the TPMS data are transmitted as the transmission at the prescribed rotational position.

As a result, it is possible to quickly determine the corresponding relationship between the sensor ID and the wheel position with a high degree of precision.

(2) The first rotating period determining section 11 is arranged on the side of the wheel 1, and the transmitter 2d has the first rotating period Tp annexed to the TPMS data for transmission.

As a result, the existing G sensors 2b arranged on the wheels 1 are adopted to determine the first rotating period Tp. Consequently, it is possible to cut the cost that would otherwise be caused by the addition of the new sensors to the wheels.

Application Example 2

Application Example 2 differs from Application Example 1 in that the first rotating period determining section is arranged on the side of the vehicle body. In the following, only the features different from Application Example 1 will be explained.

Constant Position Transmission Mode

The sensor CU 2c of the TPMS sensor 2 transmits the TPMS data once every prescribed interval (e.g., 16 sec), and the same TPMS data are transmitted in 3 rounds each time when the rotational position of the TPMS sensor 2 becomes the top point, that is, each time when the gravity acceleration dependent component of the acceleration in the centrifugal direction detected by the G sensor 2b reaches the peak (1 [G]). In the following, in the transmission order of the 3 TPMS data, the TPMS data are the first frame of TPMS data, the second frame of TPMS data and the third frame of TPMS data.

Wheel Position Determination Control

Figure 9:
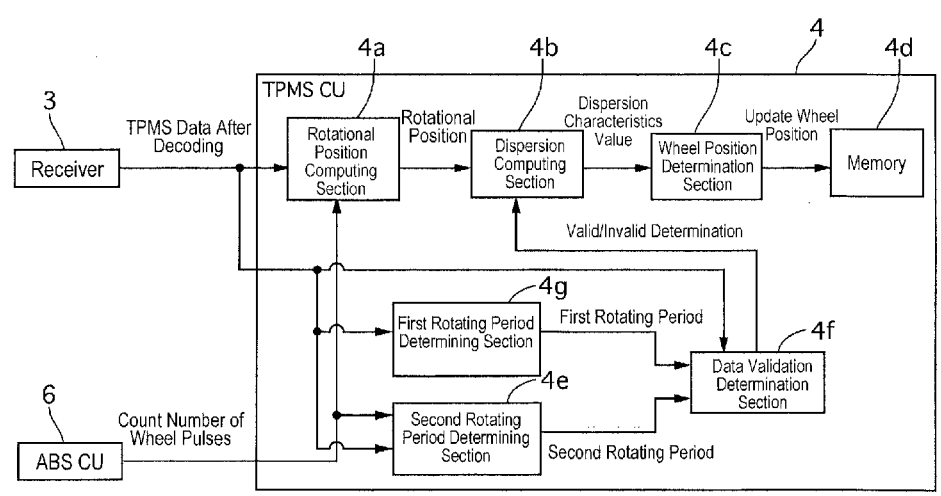
FIG. 9 is a block diagram illustrating the control of the TPMSCU4 for executing the wheel position determination control in Application Example 2.

FIG. 9 is a block diagram illustrating the control of the TPMSCU 4 for executing the wheel position determination control in Application Example 2. Application Example 2 differs from Application Example 1 in that the first rotating period determining section 4g (the transmission position determination means) is arranged in the TPMSCU 4. Consequently, the configuration of the TPMS sensor 2 in Application Example 2 differs from that of Application Example 1 shown in FIG. 2 in that the first rotating period determining sections 11 are not arranged.

The first rotating period determining section 4g computes the time from the transmission of the first frame of TPMS data to the transmission of the second frame of TPMS data as the first rotating period Tp1 and the time from the transmission of the second frame of TPMS data to the third frame of TPMS data as the first rotating period Tp2.

In the following, the operation of valid data determination will be explained.

Figure 10:
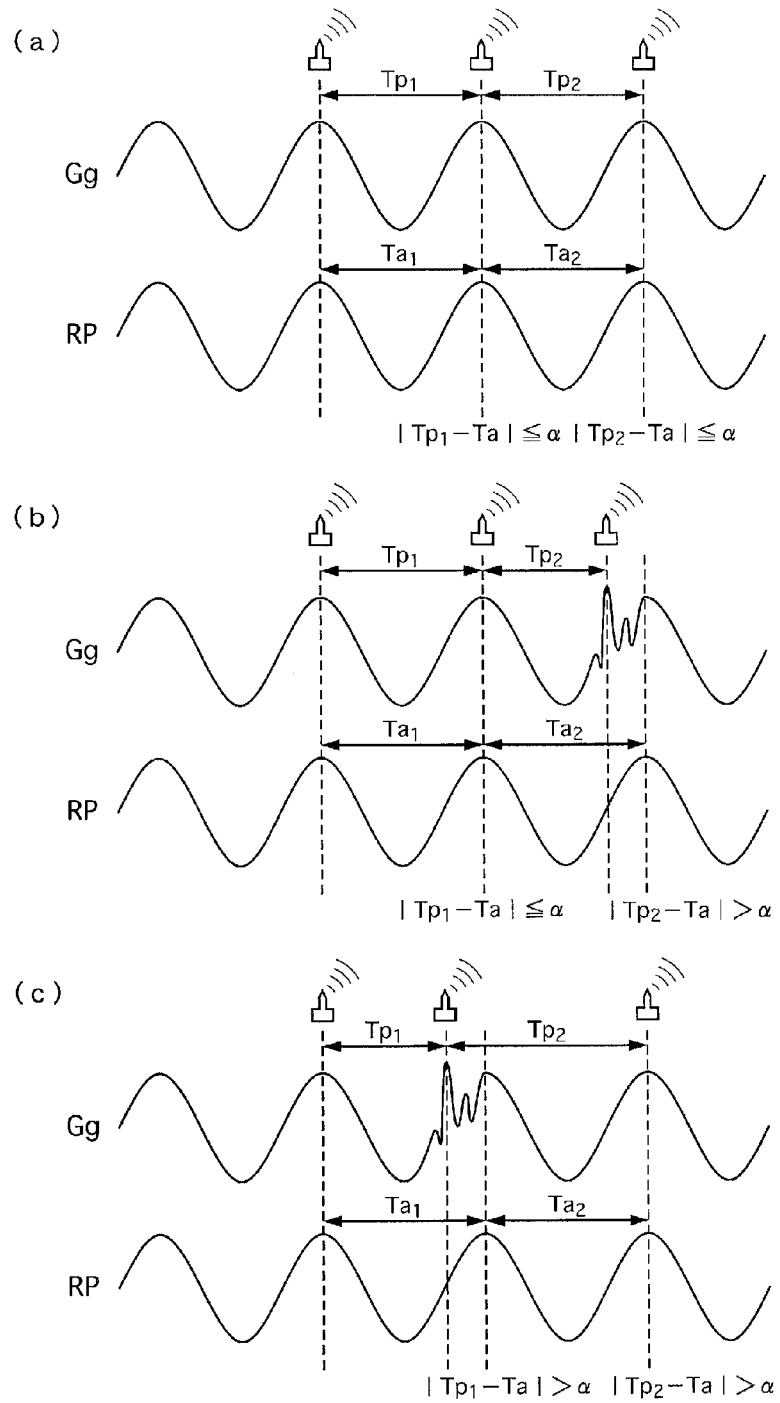
FIG. 10 is a diagram illustrating the variation over time of the gravity acceleration dependent component Gg of the acceleration in the centrifugal direction detected by the G sensor $2b$ of a certain wheel and the rotational position RP of this wheel determined from the count value of the wheel velocity pulses.

FIG. 10 is a diagram illustrating the variation over time of the gravity acceleration dependent component Gg of the acceleration in the centrifugal direction detected by the G sensor 2b of a certain wheel and the rotational position RP of the wheel described above determined from the count value of the wheel velocity pulses.

The first rotating periods Tp1 and Tp2 are the transmission intervals of the frames of the TPMS data. Consequently, as shown in FIG. 10(a), when the TPMS sensors 2 are transmitted when the TPMS sensor 2 is on the top point for all of the frames, both of the first rotating periods Tp1 and Tp2 are almost in agreement with the second rotating periods Ta1 and Ta2. That is, as shown in FIG. 10(a), when the absolute value of the difference between the first rotating period Tp1 and the second rotating period Ta1 and the absolute value of the difference between the first rotating period Tp2 and the second rotating period Ta2 both are smaller than the prescribed value α, it is possible to determine that all of the frames of the TPMS data are transmitted at the prescribed rotational position (the top point). Consequently, the rotational position of each wheel 1 detected when all of the frames of TPMS data are transmitted as the valid data can be determined efficiently.

On the other hand, as shown in FIG. 10(b), when the gravity acceleration dependent component Gg at the position before the TPMS sensor 2 becomes the prescribed rotational position due to noise after the transmission of the second frame of the TPMS data reaches the peak (1 [G]), and when the third frame of TPMS data is transmitted at the position described above, the first rotating period Tp2 is shorter than the second rotating period Ta2, and the difference between the two increases. That is, as shown in FIG. 10(b), when the absolute value of the difference between the first rotating period Tp1 and the second rotating period Ta1 is equal to or smaller than the prescribed value α and the absolute value of the difference between the first rotating period Tp2 and the second rotating period Ta2 is larger than the prescribed value α, a determination is made that the third frame of TPMS data is not transmitted at the prescribed rotational position. Consequently, the rotational position of each wheel 1 detected when the first frame and second frame of the TPMS data are transmitted is determined to be the valid data, and the rotational position of each wheel 1 detected when the third frame of the TPMS data is transmitted is determined to be invalid data.

Also, as shown in FIG. 10(c), when the gravity acceleration dependent component Gg reaches the peak (1 [G]) when the TPMS sensor 2 reaches the position before the prescribed rotational position by the noise after the transmission of the first frame of the TPMS data, and when the second frame of the TPMS data is transmitted at the position, the first rotating period Tp1 is shorter than the second rotating period Ta1, and the first rotating period Tp2 is longer than the second rotating period Ta2. Here, in the practice, the third frame of TPMS data is transmitted at the prescribed rotational position, yet this cannot be determined by the TPMSCU 4. Consequently, as shown in FIG. 10(c), when the absolute value of the difference between the first rotating period Tp1 and the second rotating period Ta1 and the absolute value of the difference between the first rotating period Tp2 and the second rotating period Ta2 both are larger than the prescribed value α, the rotational position of each wheel 1 detected when all of the frames of the TPMS data are transmitted is determined to be the invalid data.

For the tire pneumatic pressure monitoring apparatus in Application Example 2, in addition to the effect (1) of Application Example 1, the following effect can be displayed.

(3) The first rotating period determining section 4g is arranged on the side of the vehicle body.

As a result, it is possible to decrease the load of computing on the side of the TPMS sensor 2, which thus allows for a cut in the power consumption.

While certain embodiments have been described, these embodiments have been presented by way of example only, and they are not intended to limit the scope of the invention. Indeed, the novel embodiment described herein may be embodied in a variety of other forms; furthermore, various omissions, substitutions and changes in the form of the embodiment described herein may be made without departing from the spirit of the invention. The accompanying acclaims and their equivalents are intended to cover such forms or modifications as would fall within the scope and spirit of the invention.

The invention claimed is:

1. A tire pneumatic pressure monitoring apparatus comprising:
   a tire pneumatic pressure sensor configured to be installed on a tire of each wheel to detect pneumatic pressure acting on the tires;
   an acceleration sensor configured to be installed on the tire of each of the wheels to detect an acceleration in a prescribed direction acting on the tires;
   a transmitter arranged on each of the wheels to detect a rotational position of a corresponding one of the wheels based on a detected value of the acceleration sensor, the transmitter wirelessly transmitting the pneumatic pressure at a prescribed rotational position together with a unique information identifier as a wireless signal;
   a receiver configured to be arranged on a vehicle body to receive the wireless signals;
   a wheel velocity sensor arranged to detect a velocity of a corresponding one of the wheels;
   a rotational position computing section arranged on to detect the rotational position of each of the wheels upon the wireless signal containing the unique information identifier being transmitted;
   a transmitting position determination section comprising a first rotating period determining section that determines a wheel rotating period of the wheel corresponding to the unique information identifier when the wireless signal is transmitted based on the detected value of the acceleration sensor as the first rotating period, a second rotating period determining section that determines the rotating period of the wheel corresponding to the unique information identifier when the wireless signal is transmitted as the second rotating period based on the detected value of the wheel velocity sensor, and a determination section that validates the rotational position of each of the wheels based on a difference between the first rotating period and the second rotating period for the wireless signal transmitted at the prescribed rotational position when the difference between the first rotating period and the second rotating period is equal to or smaller than a prescribed value, and invalidates the rotational position of each of the wheels based on a difference between the first rotating period and the second rotating period for the wireless signal transmitted at the prescribed rotational position when the difference between the first rotating period and the second rotating period is greater than the prescribed value; and
   a wheel position determination section that determines the wheel position of the transmitter corresponding to the unique information identifier based on the rotational position of each of the wheels when the wireless signal is transmitted that determines that transmission is made at the prescribed rotational position.

2. The tire pneumatic pressure monitoring apparatus according to claim 1, wherein
   the first rotating period determining section is arranged on each wheel side; and
   the transmitter has the first rotating period annexed to the wireless signal and transmitted.

3. The tire pneumatic pressure monitoring apparatus according to claim 1, wherein
   the first rotating period determining section is arranged on the vehicle body side.

* * * * *